United States Patent
Ishikawa

(10) Patent No.: US 9,079,526 B2
(45) Date of Patent: Jul. 14, 2015

(54) DRIVING ABILITY REDUCTION DETERMINING APPARATUS

(71) Applicant: DENSO CORPORATION, Kariya, Aichi-pref. (JP)

(72) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 34 days.

(21) Appl. No.: 13/900,740

(22) Filed: May 23, 2013

(65) Prior Publication Data

US 2013/0328673 A1    Dec. 12, 2013

(30) Foreign Application Priority Data

Jun. 1, 2012   (JP) ................................. 2012-126148

(51) Int. Cl.
| | |
|---|---|
| *B60Q 1/00* | (2006.01) |
| *G02B 27/01* | (2006.01) |
| *G08B 21/06* | (2006.01) |

(52) U.S. Cl.
CPC ........ *B60Q 1/00* (2013.01); *G02B 27/01* (2013.01); *G02B 2027/014* (2013.01); *G02B 2027/0138* (2013.01); *G02B 2027/0187* (2013.01); *G08B 21/06* (2013.01)

(58) Field of Classification Search
CPC ........... B60N 2/002; G08G 1/00; G02B 27/01
USPC ............ 340/439; 600/301; 701/213, 211, 208
See application file for complete search history.

(56) References Cited

U.S. PATENT DOCUMENTS

| | | | |
|---|---|---|---|
| 5,131,848 A | * | 7/1992 | Adams ........................... 434/69 |
| 5,311,877 A | | 5/1994 | Kishi |

(Continued)

FOREIGN PATENT DOCUMENTS

| | | |
|---|---|---|
| JP | 2005-069800 A | 3/2005 |
| JP | 2010-006178 A | 1/2010 |

(Continued)

OTHER PUBLICATIONS

Gary L. Rupp et al., "The Peripheral Detection Task (PDT): On-line Measurement of Driver Cognitive Workload and Selective Attention", Performance Metric for Assessing Drive Distraction: The Quest for Improved Road Safety, Chapter 4, SAE International (Discussed in the specification).

(Continued)

*Primary Examiner* — Shirley Lu
(74) *Attorney, Agent, or Firm* — Posz Law Group, PLC

(57) ABSTRACT

A driving ability reduction determining apparatus comprising a virtual image display portion, an operation portion, a response detection portion and a driving ability determination portion is disclosed. The virtual image display portion emits a determination-usage display image toward a windshield, thereby displaying to the driver the determination-usage display image as a virtual image through the windshield. The operation portion is operated by the driver when the driver visually recognizes the determination-usage display image. The response detection portion detects a response situation of driver's operation of the operation portion in response to display of the determination-usage display image by the virtual image display portion. The driving ability determination portion determines the driving ability reduction of the driver based on a detection result of the response detection portion.

17 Claims, 7 Drawing Sheets

(56) References Cited

U.S. PATENT DOCUMENTS

| | | | |
|---|---|---|---|
| 2002/0146667 A1* | 10/2002 | Dowdell et al. | 434/62 |
| 2007/0203646 A1* | 8/2007 | Diaz et al. | 701/213 |
| 2009/0092284 A1* | 4/2009 | Breed et al. | 382/103 |
| 2010/0076273 A1 | 3/2010 | Shigetou | |
| 2010/0253492 A1* | 10/2010 | Seder et al. | 340/435 |
| 2012/0179008 A1* | 7/2012 | Burton | 600/301 |

FOREIGN PATENT DOCUMENTS

| | | |
|---|---|---|
| JP | 2010-221903 A | 10/2010 |
| JP | 2013-235341 A | 11/2013 |

OTHER PUBLICATIONS

Lisbeth Harms et al., "Peripheral detection as a measure of driver distraction. A study of memory-based versus system-based navigation in a built-up area," Transportation Research, Part F 6, 2003, pp. 23-36.

Christopher J.D. Pattern et al., "Driver experience and cognitive workload in different traffic environments," Accident Analysis and Prevention, 38, 2006, pp. 887-894.

Office action mailed on Feb. 4, 2014 in the corresponding JP application No. 2012-126148 (and English translation).

* cited by examiner

DRIVING ABILITY REDUCTION DETERMINING APPARATUS

CROSS REFERENCE TO RELATED APPLICATION

The present application is based on and claims priority to Japanese Patent Application No. 2012-126148 filed on Jun. 1, 2012, disclosure of which is incorporated herein by reference.

TECHNICAL FIELD

The present disclosure relates to a driving ability reduction determining apparatus for highly accurately determining whether a driving ability of a vehicle's driver is reduced in association with awakeness reduction, fatigue, heavy load, stress or the like of the vehicle's driver.

BACKGROUND

Conventionally, there is known an apparatus which provides a visual stimulus to a driver using a LED mounted to a dashboard of a vehicle or a LED fixed (head-mounted) in front of the driver and which measures a driver's driving ability reduction based on a response result, which is a driver's button operation in response to the visual stimulus (see, for example, Non Patent Document 1).
Non Patent Document 1: Gary L. Rupp, Performance Metrics for Assessing Driver Distraction: The Quest for Improved Road Safety, SAE International

SUMMARY

According to studies of the inventor of the present application, in the technology described in the above Non Patent Document 1, the head-mounted LED or the on-dashboard LED generates the visual stimulus at a very closer position than vehicles, people, and traffic lights in a three-dimensional space does. Thus, when the driver checks the visual stimulus generated by the head-mounted LED or the on-dashboard LED, the driver needs to largely move the line of sight to his near side from a state of watching a scene ahead of the vehicle. This may worsen safety during vehicle traveling.

The present disclosure is made in view of this kind of problem and has an object to provide a technology that can determine a driver's driving ability reduction without worsening the safety during vehicle traveling.

A driving ability reduction determining apparatus according to one example of the present disclosure comprises a virtual image display portion, an operation portion, a response detection portion and a driving ability determination portion. The virtual image display portion emits a determination-usage display image, which is preset for determining driving ability reduction of a driver of a vehicle, toward a windshield arranged ahead of the driver, thereby displaying to the driver the determination-usage display image as a virtual image through the windshield. The operation portion is operated by the driver when the driver visually recognizes the determination-usage display image. The response detection portion detects a response situation of driver's operation of the operation portion in response to display of the determination-usage display image by the virtual image display portion. The driving ability determination portion determines the driving ability reduction of the driver based on a detection result of the response detection portion.

According to the above-configured driving ability reduction determining apparatus, since the determination-usage display image is displayed as the virtual image through the windshield, the driver visually recognizes the determination-usage display image over a real scene ahead of the vehicle. Therefore, the driver watching a road situation ahead of the vehicle through the windshield can do an action of operating the operation portion in response to the determination-usage display image, without largely moving his line of sight. Accordingly, the driving ability reduction determining apparatus can determine the driver's driving ability reduction without worsening the safety during vehicle traveling.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

A first embodiment of the present disclosure will be described with reference to the drawings.

Figure 1:
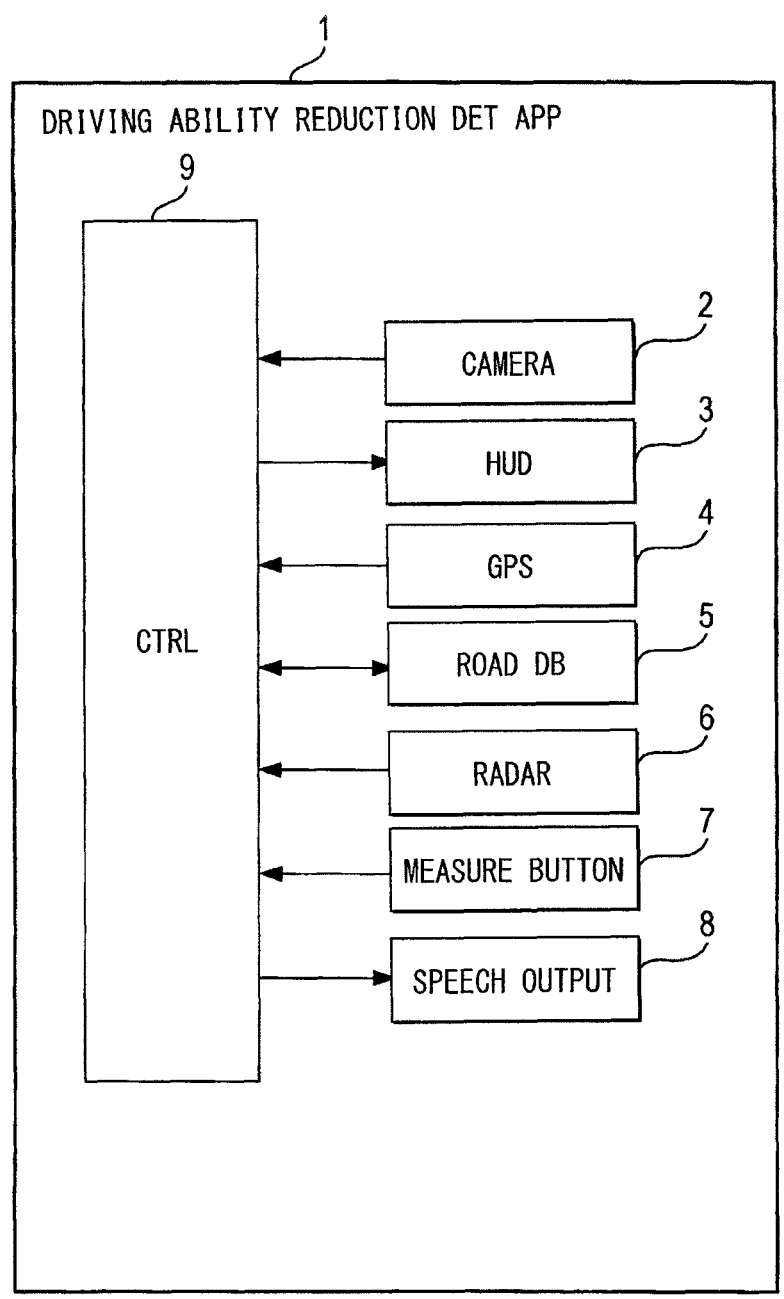
FIG. 1 is a block diagram illustrating a configuration of a driving ability reduction determining apparatus.

A driving ability reduction determining apparatus 1 of the present disclosure is mounted to a vehicle and measures the driving ability reduction occurring in association with awakeness reduction, fatigue, heavy load, stress or the like of the driver. As shown in FIG. 1, the driving ability reduction determining apparatus 1 includes a camera 2, a head up display device (also referred to hereinafter as a HUD device) 3, a GPS (Global Positioning System) receiver 4, a road database 5, a radar device 6, a measurement-usage button 7, a speech output device 8 and a controller 9.

The camera 2 successively photographs a scene ahead of a vehicle equipped with the driving ability reduction determining apparatus 1 (also referred to hereinafter as an own vehicle).

Figure 2:
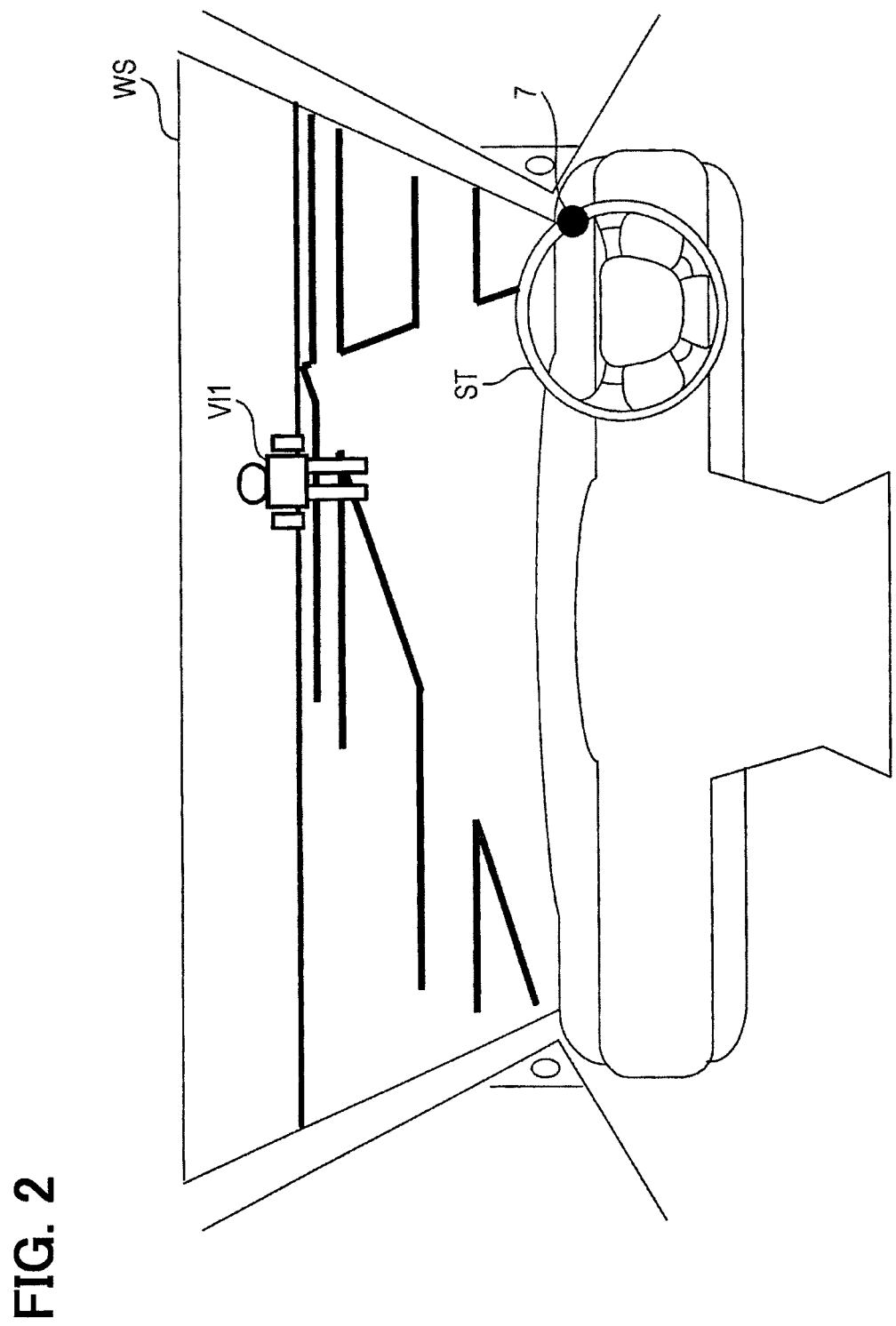
FIG. 2 is a diagram illustrating a virtual image viewed through a windshield toward a vehicle front.

The HUD device 3 emits a display light, which is for display of an image, from a lower side of a windshield WS (see FIG. 2) toward the windshield WS. Because of this, the driver visually recognizes a projected virtual image over the actual scene ahead of the vehicle (see FIG. 2 for virtual image VI1).

The GPS receiver 4 receives a transmitted radio wave from GPS satellites to detect a position coordinate of the vehicle.

The road database 5 stores road data representing position coordinates of roads in a predetermined region (e.g., whole U.S. area).

The radar device 6 transmits a radar wave forward from the vehicle and receives the reflected radar wave, thereby detecting a distance to a preceding vehicle.

The measurement-usage button 7 is provided on a steering ST of the vehicle (see FIG. 2) and is to be pressed down by the driver in driving ability reduction measurement.

The speech output device 8 is provided in a vehicle compartment and notifies various informations to the occupant of the vehicle in the form of speech.

The controller 9 includes a microcomputer with a CPU, a ROM, a RAM, an I/O, a bus line connecting these components, and the like. The controller 9 controls the HUD device 3 and the speech output device 8 by performing various processes based on inputs from the camera 2, the GPS receiver 4, the road database 5, the radar device 6 and the measurement-usage button 7.

Figure 3:
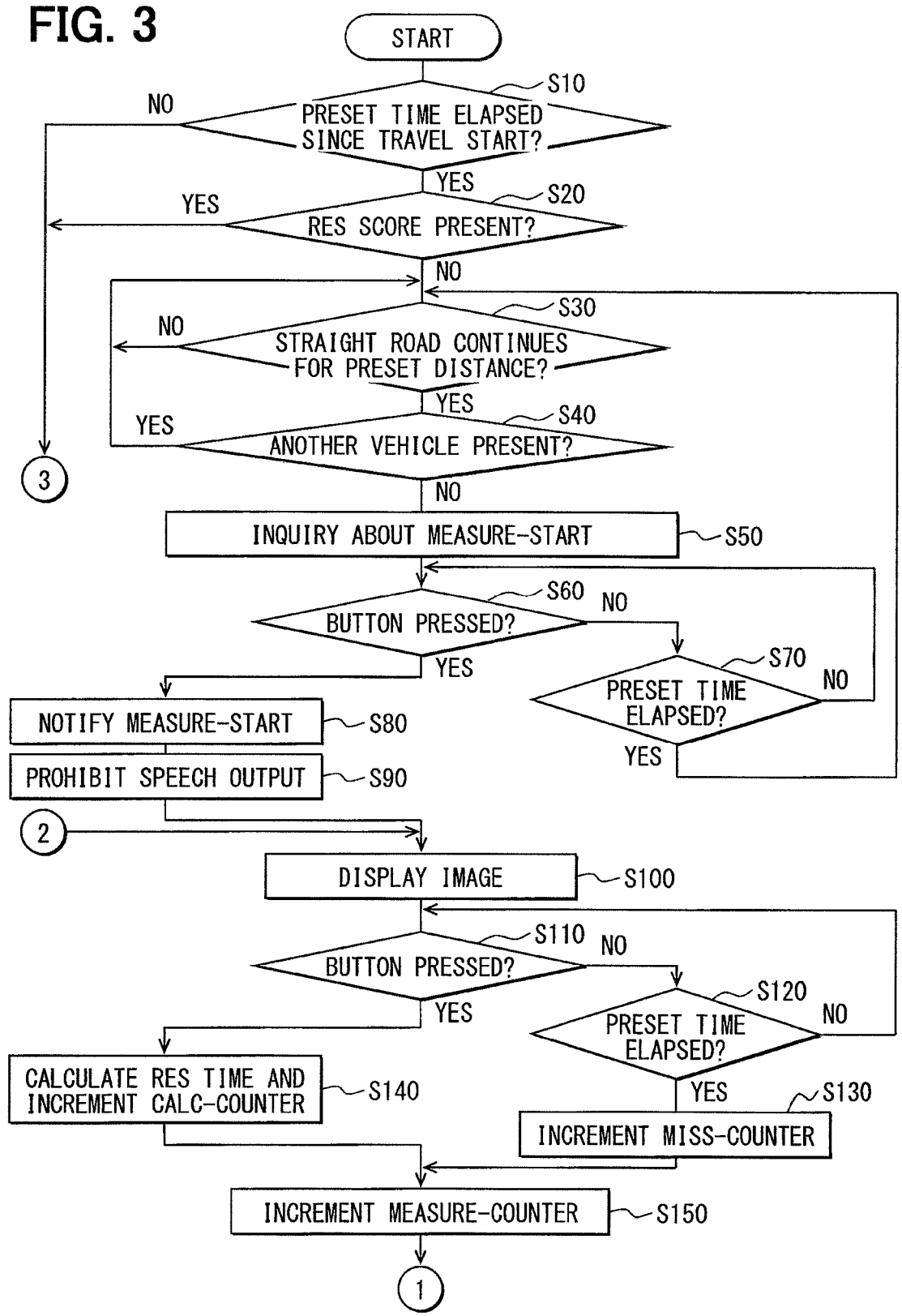
FIG. 3 is a flowchart illustrating a first half of a driving ability reduction determination process.
Figure 4:
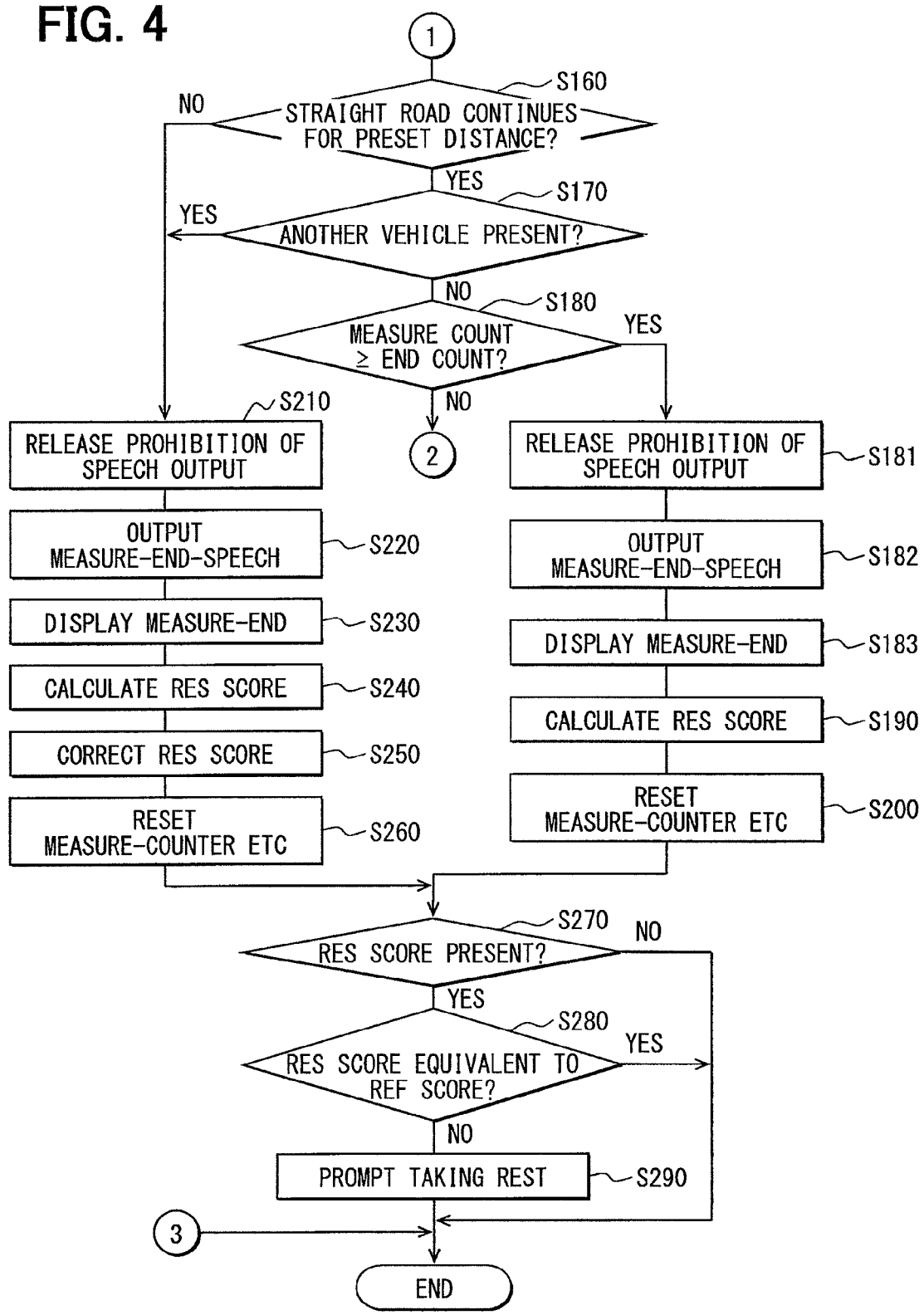
FIG. 4 is a flowchart illustrating a latter half of the driving ability reduction determination process.

A procedure of driving ability reduction determination process performed by the controller 9 of the above-configured driving ability reduction determining apparatus 1 will be described with reference to FIG. 3 and FIG. 4. The controller 9 in operation repeatedly performs this driving ability reduction determination process.

Upon starting the driving ability reduction determination process, the controller 9 in S10 determines whether or not a preset measurement start time (e.g., 30 minutes in the present embodiment) has elapsed since the own vehicle started traveling. When the preset measurement start time has not elapsed since the start of traveling (S10: NO), the driving ability reduction determination process is once ended. When the preset measurement start time has elapsed since the start of traveling (S10: YES), the controller 9 in S20 determines whether or not a response score (described later) has been calculated already.

When the response score has been calculated already (S20: YES), the driving ability reduction determination process is once ended. When the response score has not been calculated, the controller 9 in S30 determines both whether or not a road on which the vehicle is traveling is straight and whether or not this straight state continues for a preset measurement start determination distance (e.g., 2000 meters in the present embodiment), based on the present position of the own vehicle detected with the GPS receiver 4 and the road data stored in the road database 5. In the below, the above determination in S30 is also described as a determination of whether or not the straight road continues for the measurement start determination distance.

Figure 5:
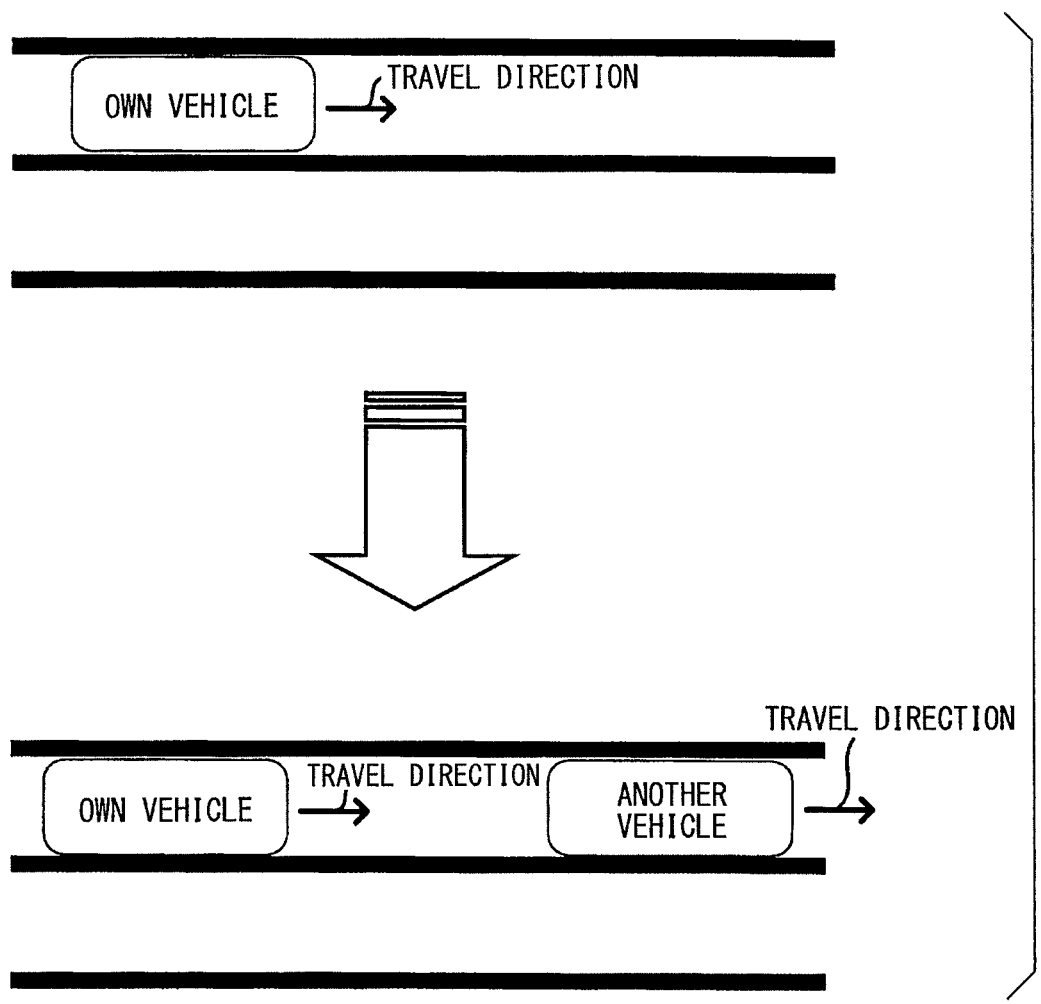
FIG. 5 is a diagram illustrating transition to a situation in which there is a vehicle ahead of an own vehicle traveling a straight road.

When the straight road does not continue for the measurement start determination distance (S30: NO), the controller 9 repeats S30, thereby waiting for a straight road continuing for the measurement start determination distance or more. When here is the straight road continuing for the measurement start determination distance or more (S30: YES), the controller 9 in S40 determines whether or not another vehicle is present around the own vehicle, based on an image processing result of the image photographed by the camera 2 and a detection result of the radar device 6. For example, when the situation is changed from the absence of a vehicle ahead of the own vehicle to the presence of a vehicle ahead of the own vehicle traveling on the straight road (see FIG. 5), it is determined that another vehicle is present around the own vehicle.

When another vehicle is present around the own vehicle (S40: YES), the controller 9 proceeds to S30 to repeat the above processing. When another vehicle is not present around the own vehicle (S40: NO), the controller 9 in S50 causes the HUD device 3 to output the display for inquiring the driver about permission to start the measurement of the driving ability reduction and causes the speech output device 8 to output the speech for inquiring the driver about permission to start the measurement of the driving ability reduction.

Thereafter, in S60, the controller 9 determines whether or not the measurement-usage button 7 is pressed down. When the measurement-usage button 7 is not pressed down (S60: NO), the controller 9 in S70 determines whether or not a preset pressing-down determination time (e.g., 10 seconds in the present embodiment) has elapsed since S50 was performed (i.e., since the inquiry about the start of measurement was made). When the pressing-down determination time has not elapsed (S70: NO), the controller 9 proceeds to S60 to repeat the above processing. When the pressing-down determination time has elapsed (S70: YES), the controller 9 proceeds to S30 to repeat the above processing.

When the measurement-usage button 7 is pressed down (S60: YES), the controller 9 in S80 causes the HUD device 3 to output the display indicative of the start of the measurement of driving ability reduction and causes the sound output device 8 to output the speech indicative of the start of the measurement of driving ability reduction. Thereafter, in S90, the controller 9 prohibits the sound output from an audio device (not shown) mounted to the own vehicle vehicle.

In S100, based on the road data stored in the road database 5, the controller 9 determines shape of the road ahead of the own vehicle and causes the HUD device 3 to display an virtual image, which is a computer graphic (CG) representing a car, a pedestrian, a bicycle, a traffic sign or the like (also referred to hereinafter as visual stimulus image), so that the driver can visually recognize the virtual image at a position corresponding to the real road. For example, the visual stimulus image of a pedestrian or a bicycle is displayed over the real scene, so that the driver can visually recognize that the visual stimulus image of a pedestrian or a bicycle is at a position in the road where the car is not permitted to travel (see FIG. 2 for virtual image VI1). The visual stimulus image of a car is displayed over the real scene, so that the driver can visually recognize that the visual stimulus image of a car is at a position in a driveway ahead of the own vehicle.

Thereafter, in S110, the controller 9 determines whether or not the measurement-usage button 7 is pressed down. When the measurement-usage button 7 is not pressed down (S110: NO), the controller 9 in S120 determines whether or not a preset response determination time (e.g., 2 seconds in the present embodiment) has elapsed since S100 was performed (i.e., since the visual stimulus image was displayed). When the response determination time has not elapsed (S120: NO), the controller 9 proceeds to S100 to repeat the above-processing. When the response determination time has elapsed (S120: YES), the controller 9 in S130 increments a missing counting counter, which indicates the number of times the response is missing. The controller 9 proceeds to S150.

When the measurement-usage button 7 is pressed down (S110: YES), the controller 9 in S140 calculates, as a response time, an elapsed time from when S100 was performed (i.e., when the visual stimulus image was displayed) to when the measurement-usage button 7 was pressed. Additionally, the controller 9 increments a calculation counting counter, which indicates the number of times the response time is calculated. Thereafter, the controller 9 proceeds to S150.

In S150, the controller 9 increments a measurement counting counter, which indicates the number of times the reaction time is measured. Thereafter, in S160, the controller 9 determines whether or not the straight road continues for the preset measurement start determination distance, in the same manner as in S130. When the straight road does not continue for the preset measurement start determination distance (S160: NO), the controller 9 proceeds to S210. When the straight road continues for the preset measurement start determination distance (S160: YES), the controller 9 in S170 determines whether or not another vehicle is present vehicle around the own vehicle, in the same manner as in S40.

When another vehicle is present around the own vehicle (S170: YES), the process proceeds to S210. When no vehicle is present around the own vehicle (S170: NO), the controller 9 in S180 determines whether or not value of the measurement counting counter (also referred to hereinafter as a measurement count) is greater than or equal to a preset end determination count (for example, 50 in the present embodiment).

When the measurement count is less than the end determination count (S180: NO), the controller 9 proceeds to S100 to repeat the above-processing. When the measurement count is greater than or equal to the end determination count (S180: YES), the controller 9 in S181 releases the prohibition of the speech output from the audio device mounted to the vehicle. In S182, the controller 9 causes the speech output device 8 to output the speech indicative of the end of the driving ability reduction measurement. In S183, the controller 9 causes the HD display device 3 to execute the display indicative of the end of the driving ability reduction measurement. Thereafter, in S190, the controller 9 calculates a response score. The response score includes an average of reaction times (also referred to hereinafter as a reaction time average) and a reaction missing ratio. The reaction time average is calculated by dividing a total sum of the reaction time calculated in S140 by the value of the calculation counting counter. The reaction missing ratio is calculated by dividing the value of the missing counting counter by the value of the measurement counting counter.

Thereafter, in S200, the controller 9 resets the measurement counting counter, the calculation counting counter and the missing counting counter (i.e., sets the values of the counters to zero), and proceeds to S270.

Figure 6:
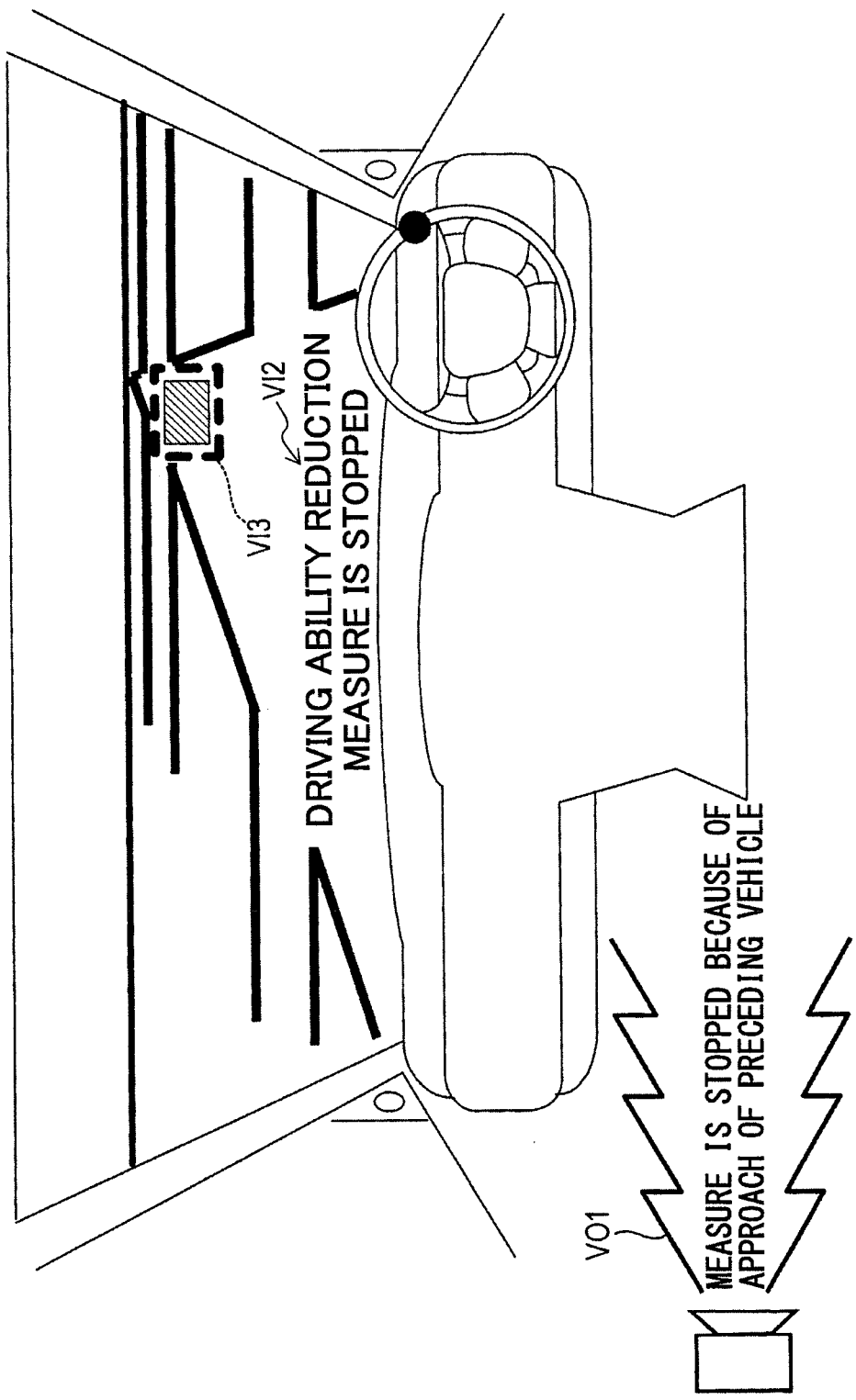
FIG. 6 is a diagram illustrating how to notify stop of measurement.

Upon proceeding to S210, the controller 9 release the prohibition (S90) of the speech output of the audio device mounted to the vehicle. In S220, the controller 9 causes the speech output device 8 to outputs the speech indicative of the stop of the driving ability reduction measurement (see FIG. 6 for speech VO1). In S230, the controller 9 causes the HUD device 3 to execute the display indicative of the stop of the driving ability reduction measurement (see FIG. 6 for virtual image VI2). In S230, in the case of the stop of the measurement because of the presence of another vehicle around the own vehicle, the controller 9 causes the HUD device 3 to provide the display highlighting the area where this another vehicle is present (see FIG. 6 for virtual image VI3).

In S240, the controller 9 calculates the response score in the same manner as in S190. Additionally, in S250, the controller 9 corrects the response score calculated in S240, in accordance with the value of the measurement counting counter (measurement count). Specifically, the controller 9 multiplies the reaction time average by a correction factor that depends on the measurement count, thereby regarding this multiplication result value as a response time average of the response score. In this connection, when the measurement count is less than 20, the present embodiment assumes no response score. When the measurement count is between 20 inclusive and 29 inclusive, the correction factor is 1.15. When the measurement count is between 30 inclusive and 39 inclusive, the correction factor is 1.10. When the measurement count is between 40 inclusive and 49 inclusive, the correction factor is 1.05.

Thereafter, in S260, the controller 9 resets the measurement counting counter, the calculation counting counter and the missing counting counter (i.e., sets the values of the counters to zero), and the controller 9 proceeds to S270.

Upon proceeding to S270, the controller 9 determines whether or not the response score has been calculated in S190 or S240. When thee response score has not been calculated (S270: NO), the driving ability reduction determination process is once ended. When the response score has been calculated (S270: YES), the controller 9 in S280 determines whether or not the response score is equivalent to a reference score. In this regard, the reference score is a response score that was preliminarily measured when a driver is in a neutral state.

When the response score is equivalent to the reference score (S280: YES), the driving ability reduction determination process is once ended. When the response score is not equivalent to the reference score (S280: NO), the controller 9 in S290 causes the speech output device 8 to output the speech prompting taking a rest, and the driving ability reduction determination process is once ended.

In the above-configured driving ability reduction determining apparatus 1, the HUD device 3 emits a visual stimulus image, which is a preset image for determining the driver's driving ability reduction, toward the windshield WS arranged in front of the driver of the vehicle. Thereby, the HUD device displays to the driver the visual stimulus image as a virtual image through the windshield WS. When the driver visually recognizes the visual stimulus image, the measurement-usage button 7 is operated by the driver when the driver the visually recognizes the visual stimulus image. Then, the response score, which includes the response time average and the response missing ratio when the driver operates the measurement-usage button 7 in response to the visual stimulus image displayed by the HUD device 3, are calculated (S100 to S260). Based on the response score, the driver's driving ability reduction is calculated (S280).

In the above-configured driving ability reduction determining apparatus 1, since the visual stimulus image is displayed as the virtual image through the windshield WS, the driver visually recognizes the visual stimulus image over the real scene ahead of the vehicle. Therefore, the driver watching the road situation ahead of the vehicle through the windshield WS can do an action of operating the measurement-usage button 7 in response to the visual stimulus image, without largely moving his line of sight. Accordingly, the driving ability reduction determining apparatus 1 can determine the driver's driving ability reduction without worsening the safety during vehicle traveling.

The visual stimulus image may be an image representing a vehicle, a person, or a bicycle. When the visual stimulus image is a vehicle, the HUD device 3 displays the visual stimulus image, so that the visual stimulus image is positioned in an area (i.e., driveway) where the vehicle is permitted to travel. When the visual stimulus image is a bicycle, the visual stimulus image is displayed, so that the visual stimulus image is positioned in an area (e.g., sidewalk, a road shoulder) where the bicycle is permitted to travel. When the visual stimulus image is a pedestrian, the visual stimulus image is displayed, so that the visual stimulus image is positioned in an area (e.g., sidewalk, a road shoulder) where the pedestrian is permitted to walk. Accordingly, the calculated response becomes directed to an expected situation where the vehicle, the person or the bicycle actually appears, and therefore, it becomes possible to estimate the ability to identify real risks.

Additionally, it is determined whether or not the straight road continues for the measurement start determination distance (S30, S160), based on the present position of the own vehicle detected with the GPS receiver 4 and the road data stored in the road database 5. When the straight road does not continue for the measurement start determination distance (S30, S160), the determining of the driver's driving ability reduction is prohibited. In this way, a road environmental change during determining the driver's driving ability reduction can be restricted within a certain level. A variation in driving ability reduction determination result due to road situations can be minimized.

Additionally, it is determined whether or not there is another vehicle around the own vehicle (S40, S170), based on an image processing result of the image photographed with the camera 2 and a detection result of the radar device 6. When another vehicle is present around the own vehicle (S40, S170: YES), the determining of the driver's driving ability reduction is prohibited. In this way, the safety in determining the driver's driving ability reduction during the vehicle traveling is secured.

Additionally, while the driver's driving ability reduction is being determined during the vehicle traveling, the audio device mounted to the own vehicle is prohibited from outputting the speech (S90). In this way, a compartment environmental change during determining the driver's driving ability reduction can be restricted within a certain level. A variation in driving ability reduction determination result due to factors in the vehicle compartment can be minimized.

In the above-illustrated embodiments, the HUD device 3 can correspond to an example of virtual image display portion or virtual image display means. The measurement-usage button 7 can correspond to an example of operation portion or operation means. Processing S100 to S260 performed by the controller 9 can correspond to an example of response detection portion and response detection means. Processing S280 performed by the controller 9 can correspond to an example of driving ability reduction determination portion and driving ability reduction determination means. The visual stimulus image can correspond to an example of a determination-usage display image. The response score can correspond to an example of response situation.

The camera 2, the GPS receiver 4, the road database 5 or the radar device 6 can correspond to an example of road situation detection portion and road situation detection means. Processing S30, S40, S160, S170 performed by the controller 9 can correspond to an example of determination prohibition portion or determination prohibition means. A determination condition in S30, S40, S160, S170 can correspond to an example of determination prohibition condition. Processing S90 performed by the controller 9 can correspond to an example of notification prohibition portion and notification prohibition means.

In the above, one embodiment of the present disclosure is illustrated. However, embodiments of the present disclosure are not limited to the above-illustrated embodiment and can have various forms.

For example, in the above embodiment, the computer graphic (CG) of car, pedestrian, bicycle, traffic sign or the like is displayed as the visual stimulus image. However, a geometric figure such as circle or rectangle may be displayed as the visual stimulus image. Since the geometric figure has constant brightness, size and contrast, it becomes possible to measure the driver's driving ability reduction under situations where a variation in visual stimulus is minimized.

In the above embodiment, while the driver's driving ability reduction is being determined, the speech output of the audio device mounted to the own vehicle is prohibited. Additionally, an image display of an image display device (for example, a navigation device having a map display screen) may be prohibited.

In the above embodiment, it is determined whether or not the driving ability is reduced. However, a degree of driving ability reduction may be determined.

In the above embodiment, a road situation around the vehicle is detected with the camera 2, the GPS receiver 4, the road database 5 and the radar device 6. However, a road situation around the vehicle is detected with LIDER and VICS (registered trademark).

In the above embodiment, the speech for prompting taking a rest is outputted when it is determined that the driver's driving ability is reduced. However, a message for prompting operation of a massager arranged in a driver's seat ma be outputted, or, a notification is transmitted to a management center.

In the above embodiment, the response score is calculated. This response score may be displayed on an in-vehicle monitor for enabling a temporal change to be monitored. This makes it possible to monitor a driving ability decline with time. The response score result may be transmitted to a data center or a privately-owned portable terminal to enable a temporal change to be monitored. This makes it possible to monitor a decline with age, like physical checkups.

Figure 7:
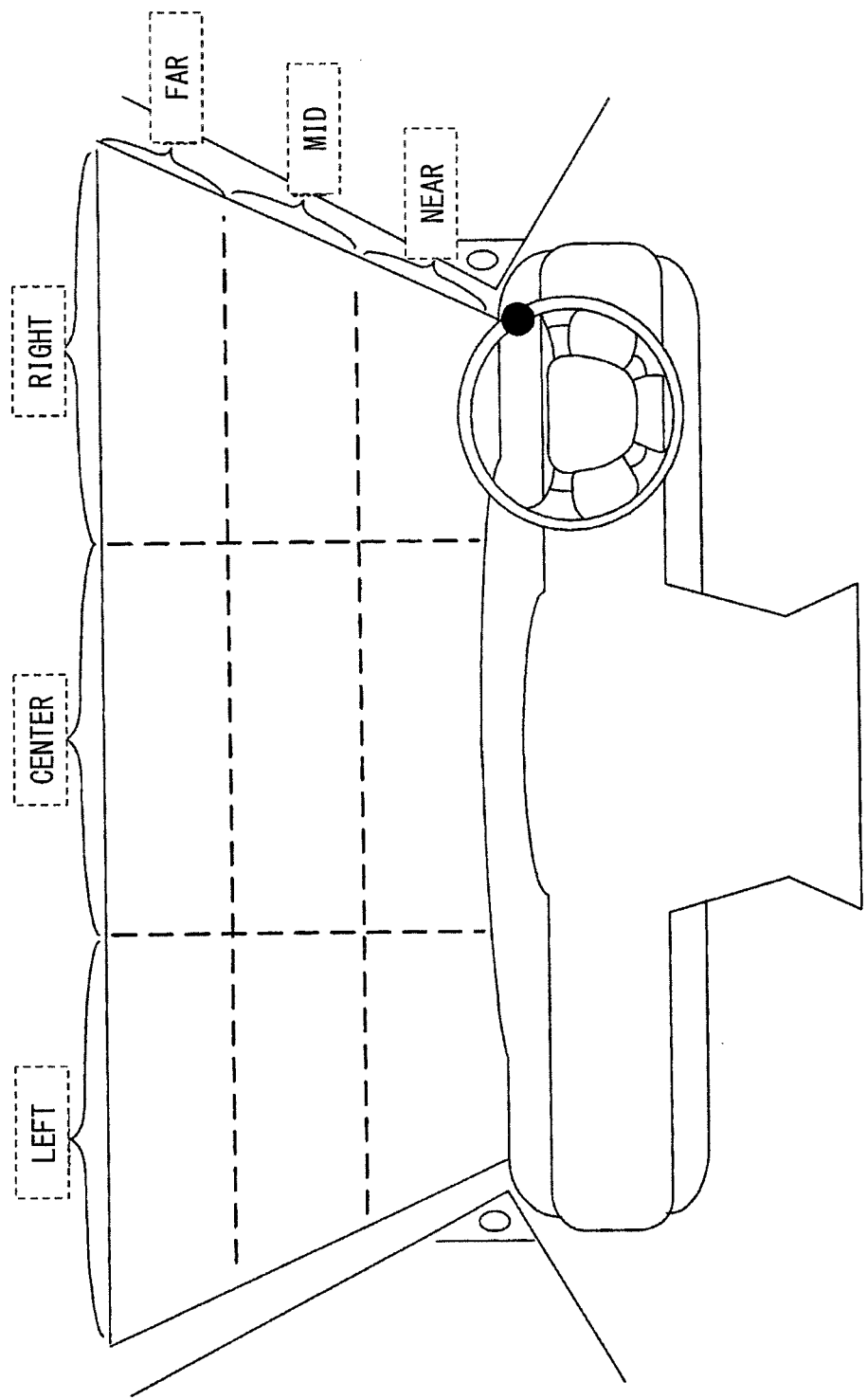
FIG. 7 is a diagram illustrating dividing a three dimensional space ahead of a vehicle.

Additionally, a three dimensional space ahead of the vehicle may be divided (for example, into {right, center, left}×{near side, middle, far side} as shown in FIG. 7). For each divided space, the response score may be calculated. For each type of CG including car, pedestrian, bicycle, traffic sign and the like, the response score may be calculated. This makes it possible to determine the driver's state in a more detailed way.

From the image photographed with the camera 2, an image area with high brightness (e.g., neon, electric light) may be recognized, so that the visual stimulus is not positioned in this bright area. This removes an influence of ambient light and makes the contrast of the visual stimulus image constant, thereby enabling the measurement of the driving ability reduction under situations where a visual stimulus variation is minimized.

In the above, embodiments and configurations of the present disclosure are illustrated. However, embodiments and configurations of the present disclosure are not limited to the above-illustrated embodiments and configurations. Embodiments and configurations obtained by appropriately combining technical portions disclosed in different embodiments and configurations are also included in embodiments and configurations of the present disclosure.

What is claimed is:

1. A driving ability reduction determining apparatus comprising:
   head-up display device that emits a determination-usage display image, which is preset for determining driving ability reduction of a driver of a vehicle, toward a windshield arranged ahead of the driver, and that displays to the driver the determination-usage display image as a virtual image through the windshield in a manner that the driver visually recognizes the determination-usage display image over an actual scene ahead of the vehicle; and
   an operation portion that is operated by the driver when the driver visually recognizes the determination-usage display image;
   a response detection portion that detects a response situation of the driver's operation of the operation portion in response to display of the determination-usage display image by the head-up display device;

a driving ability determination portion that determines a degree of the driving ability reduction of the driver based on a detection result of the response detection portion; and a controller that calculates a response score based on the detection result of the response detection portion, wherein a three dimensional space ahead of the vehicle is divided in both a left-to-right direction and a near-to-far direction, and the controller calculates a response score for each divided space ahead of the vehicle.

2. The driving ability reduction determining apparatus according to claim 1, wherein:

the determination-usage display image is an image representing at least one of another vehicle, a pedestrian, and a bicycle, each of which when displayed to the driver is displayed at a position over the actual scene where the at least one of the another vehicle, the pedestrian, and the bicycle would be found in actuality;

when the determination-usage display image represents the another vehicle or the bicycle, the head-up display device displays the determination-usage display image so that in the actual scene ahead of the vehicle, the determination-usage display image is positioned in an area where the another vehicle or the bicycle is permitted to travel; and when the determination-usage display image represents the pedestrian, the head-up display device displays the determination-usage display image so that in the actual scene ahead of the vehicle, the determination-usage display image is positioned in an area where the pedestrian is permitted to walk.

3. The driving ability reduction determining apparatus according to claim 1, wherein:

the determination-usage display image is a geometric figure.

4. The driving ability reduction determining apparatus according to claim 1, further comprising:

a road situation detection portion that detects a road situation around the vehicle; and a determination prohibition portion that determines whether or not a determination prohibition condition, which is preset to indicate the road situation unsuitable for determining the driving ability reduction of the driver, is satisfied based on the road situation detected by the road situation detection portion, wherein when the determination prohibition condition is satisfied, the determination prohibition portion prohibits the driving ability determination portion from determining the driving ability reduction of the driver.

5. The driving ability reduction determining apparatus according to claim 1, further comprising:

a notification prohibition portion that, while the driving ability determination portion is determining the driving ability reduction of the driver, prohibits at least one of: speech output of a speech output device arranged in a compartment of the vehicle; and image display of an image display device arranged in the compartment of the vehicle.

6. The driving ability reduction determining apparatus according to claim 2, wherein:

the controller calculates the response score for each type of the determination-usage display image, including the another vehicle, the bicycle, the pedestrian, and a traffic sign.

7. The driving ability reduction determining apparatus according to claim 2, wherein:

when the determination-usage display image represents the bicycle or the pedestrian, the determination-usage display image is positioned over the actual scene where a road shoulder or sidewalk is present in actuality.

8. The driving ability reduction determining apparatus according to claim 2, wherein:

when the determination-usage display image represents the another vehicle, the determination-usage display image is positioned over the actual scene where a driveway is present in actuality.

9. A driving ability reduction determining method, comprising:

emitting a determination-usage display image, which is preset for determining driving ability reduction of a driver of a vehicle, toward a windshield arranged ahead of the driver via a head-up display, displaying to the driver the determination-usage display image as a virtual image through the windshield in a manner that the driver visually recognizes the determination-usage display image over an actual scene ahead of the vehicle;

detecting a response signal indicating that the driver presses a measurement-usage button upon visually recognizing the determination-usage display image;

based on a time of display of the determination-usage display image and a time of detection of the response signal, calculating
(i) a response time, which is an elapsed time from the time of the display of the determination-usage display image to a time of driver's pressing of the measurement-usage button, or
(ii) a reaction missing count, which is a number of times the measurement-usage button is not pressed by the driver within a preset response determination time from the display of the determination-usage display image;

outputting a degree of the driving ability reduction of the driver based on the calculated response time or the calculated reaction missing count; and calculating a response score based on the detecting of the response signal, wherein a three dimensional space ahead of the vehicle is divided in both a left-to-right direction and a near-to-far direction, and calculating the response score includes calculating a response score for each divided space ahead of the vehicle.

10. The driving ability reduction determining method according to claim 9, wherein:

an image representing at least one of another vehicle, a pedestrian, and a bicycle is displayed as the determination-usage display image via the head-up display, each of which when displayed to the driver is displayed at a position over the actual scene where the at least one of the another vehicle, the pedestrian, and the bicycle would be found in actuality;

the determination-usage display image representing the another vehicle or the bicycle is displayed so that in the actual scene ahead of the vehicle, the determination-usage display image is positioned in an area where the another vehicle or the bicycle are permitted to travel; and the determination-usage display image representing the pedestrian is displayed, so that in the actual scene ahead of the vehicle, the determination-usage display image is positioned in an area where the pedestrian is permitted to walk.

11. The driving ability reduction determining method according to claim 10, wherein:
  calculating the response score includes calculating a response score for each type of the determination-usage display image, including the another vehicle, the bicycle, the pedestrian, and a traffic sign.

12. The driving ability reduction determining method according to claim 10, wherein:
  when the determination-usage display image represents the bicycle or the pedestrian, the determination-usage display image is positioned over the actual scene where a road shoulder or sidewalk is present in actuality.

13. The driving ability reduction determining method according to claim 10, wherein:
  when the determination-usage display image represents the another vehicle, the determination-usage display image is positioned over the actual scene where a driveway is present in actuality.

14. The driving ability reduction determining method according to claim 9, wherein:
  the determination-usage display image is displayed as a geometric figure.

15. A non-transitory computer readable storage medium storing a computer-executable program that causes a driving ability reduction determining apparatus to perform the method recited in claim 9.

16. The driving ability reduction determining method according to claim 9, further comprising:
  detecting a road situation around the vehicle;
  determining whether or not a determination prohibition condition, which is preset to indicate the road situation unsuitable for determining the driving ability reduction of the driver, is satisfied based on the road situation detected by the road situation detection portion; and
  when the determination prohibition condition is satisfied, prohibiting the determining the driving ability reduction of the driver.

17. A driving ability reduction determining apparatus comprising:
  head-up display device that emits a determination-usage display image, which is preset for determining driving ability reduction of a driver of a vehicle, toward a windshield arranged ahead of the driver, and that displays to the driver the determination-usage display image as a virtual image through the windshield in a manner that the driver visually recognizes the determination-usage display image over an actual scene ahead of the vehicle;
  an operation portion that is operated by the driver when the driver visually recognizes the determination-usage display image;
  a response detection portion that detects a response situation of driver's operation of the operation portion in response to display of the determination-usage display image by the head-up display device;
  a controller that calculates a response score based on the detection result of the response detection portion; and
  a driving ability determination portion that determines a degree of the driving ability reduction of the driver based on the calculated response score, wherein
  the determination-usage display image is an image representing at least one of another vehicle, a pedestrian, and a bicycle, each of which when displayed to the driver would be displayed at a position over the actual scene where the at least one of the another vehicle, the person and the bicycle would be found in actuality;
  when the determination-usage display image represents the another vehicle or the bicycle, the head-up display device displays the determination-usage display image so that the in actual scene ahead of the vehicle, the determination-usage display image is positioned in an area where the car or the bicycle is permitted to travel;
  when the determination-usage display image represents the pedestrian, the head-up display device displays the determination-usage display image so that in the actual scene ahead of the vehicle, the determination-usage display image is positioned in an area where the pedestrian is permitted to walk; and
  the controller calculates the response score for each type of the determination-usage display image, including the another vehicle, the bicycle, the pedestrian, and a traffic sign.

* * * * *